US012759484B2

(12) United States Patent
Ding

(10) Patent No.: US 12,759,484 B2
(45) Date of Patent: Oct. 13, 2026

(54) COMPONENT CONTROL METHOD FOR DEVICE AND RELATED APPARATUS

(71) Applicant: Yinwang Intelligent Technologies Co., Ltd., Shenzhen (CN)

(72) Inventor: Peng Ding, Shenzhen (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/982,302

(22) Filed: Dec. 16, 2024

(65) Prior Publication Data

US 2025/0115196 A1 Apr. 10, 2025

Related U.S. Application Data

(63) Continuation of application No. PCT/CN2023/100883, filed on Jun. 16, 2023.

(30) Foreign Application Priority Data

Jun. 17, 2022 (CN) ......................... 202210690337.4

(51) Int. Cl.

| | |
|---|---|
| ***E05B 77/44*** | (2014.01) |
| ***B60R 16/023*** | (2006.01) |
| ***B60R 16/033*** | (2006.01) |
| ***B60R 25/01*** | (2013.01) |
| ***G07C 9/00*** | (2020.01) |

(Continued)

(52) U.S. Cl.

CPC ........ *B60R 16/0231* (2013.01); *B60R 16/033* (2013.01); *B60R 25/01* (2013.01); *E05B 77/44* (2013.01)

(58) Field of Classification Search

CPC H04W 12/068; H04W 12/06; B60R 16/0231; B60R 16/033; B60R 25/01; B60R 25/04; B60R 25/24; B60R 25/246; G07C 9/00309; G07C 9/00; E05B 77/44; H04L 9/32; H04L 9/3226

See application file for complete search history.

(56) References Cited

U.S. PATENT DOCUMENTS

| | | | | |
|---|---|---|---|---|
| 9,365,188 | B1 * | 6/2016 | Penilla | B60L 53/65 |
| 10,629,012 | B1 * | 4/2020 | Gattu | B60R 25/246 |

(Continued)

FOREIGN PATENT DOCUMENTS

| | | | |
|---|---|---|---|
| CN | 109572620 | A | 4/2019 |
| JP | 2019080139 | A | 5/2019 |

(Continued)

OTHER PUBLICATIONS

English translation of PCT/CN2023/100883 International Search Report; date of mailing Sep. 12, 2023; all pages. (Year: 2023 ).*

*Primary Examiner* — Calvin Cheung
(74) *Attorney, Agent, or Firm* — Conley Rose, P.C.

(57) ABSTRACT

A component control method includes a first controller that sends a control instruction to a component when authentication performed by a second controller on the first controller has succeeded and an authentication result is trusted, and the component responds to the control instruction. Authentication on the component may be transferred to the first controller, and the first controller may control one or more components by using the control instruction.

22 Claims, 4 Drawing Sheets

200

(51) Int. Cl.

| | |
|---|---|
| ***H04L 9/32*** | (2006.01) |
| ***H04W 12/06*** | (2021.01) |

(56) References Cited

U.S. PATENT DOCUMENTS

| | | | | |
|---|---|---|---|---|
| 10,749,680 | B1 | 8/2020 | Troia et al. | |
| 12,534,045 | B2 * | 1/2026 | Wisnia | B60R 25/245 |
| 2006/0175900 | A1 | 8/2006 | Ono et al. | |
| 2013/0212659 | A1 | 8/2013 | Maher et al. | |
| 2020/0269808 | A1 | 8/2020 | Cho | |
| 2020/0322337 | A1 * | 10/2020 | Han | G06Q 10/02 |
| 2022/0212628 | A1 * | 7/2022 | Xie | H04W 4/80 |
| 2022/0377068 | A1 | 11/2022 | Yamamoto | |

FOREIGN PATENT DOCUMENTS

| | | | |
|---|---|---|---|
| JP | 2020021161 | A | 2/2020 |
| WO | 2021238968 | A1 | 12/2021 |

* cited by examiner

COMPONENT CONTROL METHOD FOR DEVICE AND RELATED APPARATUS

CROSS-REFERENCE TO RELATED APPLICATIONS

This is a continuation of International Patent Application No. PCT/CN2023/100883, filed on Jun. 16, 2023, which claims priority to Chinese Patent Application No. 202210690337.4, filed on Jun. 17, 2022. The disclosures of the aforementioned applications are hereby incorporated by reference in their entireties.

TECHNICAL FIELD

This disclosure relates to the security field, and more specifically, to a component control method for a device and a related apparatus.

BACKGROUND

With development of life, more devices are used in life, such as automobiles, motorcycles, or other smart devices. To improve security and avoid problems such as device theft, more anti-theft solutions are provided for devices.

At present, a common anti-theft solution is a point-to-point authentication solution. An automobile is used as an example. A controlled automobile component may send an authentication request to a controller, and the controller may perform authentication on the automobile component based on a key pre-negotiated by both parties. If the authentication succeeds, the automobile component can perform a corresponding function in response to a control operation. However, different devices include a variety of components with different functions, and requirements of the devices for security protection are varied.

SUMMARY

This disclosure provides a component control method for a device and a related apparatus, to meet more security protection requirements.

According to a first aspect, this disclosure provides a component control method for a device. The method may be performed by a component, or may be implemented by a chip or a chip system configured in the component, or other functional modules or software that can be configured to implement some or all functions of the component. This is not limited in this disclosure.

For example, the method includes obtaining a control instruction from a first controller, where the control instruction is an instruction sent by the first controller when authentication performed by a second controller on the first controller succeeds and an authentication result is trusted, obtaining the result of authentication performed by the second controller on the first controller, where the authentication result includes an authentication success or an authentication failure, and responding to the control instruction when the authentication result is the authentication success.

In the device, different components may be used to implement different functions. In this embodiment, the component may be controlled by the first controller, and responds after receiving the control instruction of the first controller. In other words, the first controller may control, by using the control instruction, one or more components to perform corresponding operations. The component that can be controlled by the first controller may be predefined by a device manufacturer before delivery, or the component that can be controlled by the first controller may be adjusted according to a requirement in a subsequent use process. This is not limited in this disclosure.

Because the first controller may control one or more components, the second controller performs authentication on the first controller instead of performing authentication on the components, so that the second controller does not perform authentication on all the components. In this way, it is not necessary to preset a key and implant an algorithm in all components that have authentication requirements, but the key needs to be preset and the algorithm needs to be implanted in only a few controllers, so that more components can be controlled, and an anti-theft effect is achieved. Therefore, security protection can be provided for more components, more requirements can be met, and development and maintenance costs can be reduced.

In addition, to send the control instruction to the component, two conditions, namely, successful authentication and trusted authentication result, need to be met at the same time. In other words, a condition for limiting the sending of the control instruction by the first controller is strict, so that illegal manipulation of the device can be avoided to a greater extent, and theft of the device can be avoided. Therefore, security is improved.

With reference to the first aspect, in some possible implementations of the first aspect, the authentication result is the authentication success, and the obtaining the result of authentication performed by the second controller on the first controller includes receiving an authentication success notification from the second controller, where the authentication success notification is used to notify that the authentication performed by the second controller on the first controller succeeds.

The second controller may send the authentication success notification when the authentication on the first controller succeeds, so as to notify the component of the authentication result that the authentication on the first controller succeeds.

Optionally, the authentication success notification is sent through broadcast.

The authentication success notification is sent through broadcast, so that all components in the device can receive the authentication success notification, and full coverage is implemented. The solution of sending the authentication success notification through broadcast is especially applicable to an offline diagnosis phase before the device is delivered.

Optionally, the authentication success notification is sent to one or more predefined components.

An authentication success result is sent for the one or more predefined components, so that the one or more components may receive the notification without causing unnecessary impact on other components.

A manner of sending the authentication success notification is not limited in this disclosure.

When the second controller fails to perform authentication on the first controller, the second controller may send an authentication failure notification to notify that the authentication on the first controller fails, or may not send any notification. This is not limited in this disclosure.

Both the authentication success notification and the authentication failure notification indicate the authentication result, and may be considered as examples for indicating the authentication result.

With reference to the first aspect, in some possible implementations of the first aspect, the method further includes sending a response message to the second controller, where the response message indicates that the authentication success notification is successfully received.

The component feeds back the response message to the second controller, so that the second controller can determine whether the component is normal, and further determine whether the authentication result is trusted. For example, when a component is replaced, the second controller may not receive the response message. In this case, even if the authentication on the first controller succeeds, the component still cannot perform an operation because the component may have a problem. Therefore, the second controller may set the authentication result to untrusted, to prevent the first controller from sending the control instruction, to prevent the component from responding, and to achieve an anti-theft effect.

According to a second aspect, this disclosure provides a component control method for a device. The method may be performed by a first controller, or may be implemented by a chip or a chip system configured in the first controller, or another function module or software that can be configured to implement some or all functions of the first controller. This is not limited in this disclosure.

The first controller in the second aspect may correspond to a controller #2 in the following embodiments.

For example, the method includes obtaining a result of authentication performed by a second controller on the first controller, where the authentication result includes an authentication success or an authentication failure, and when the authentication result is the authentication success and the authentication result is trusted, sending a control instruction to a component controlled by the first controller, to trigger the component to respond.

In the device, different components may be used to implement different functions. In this disclosure, the component may be controlled by the first controller, and responds after receiving the control instruction of the first controller. In other words, the first controller may control, by using the control instruction, one or more components to perform corresponding operations. The component that can be controlled by the first controller may be predefined by a device manufacturer before delivery, or the component that can be controlled by the first controller may be adjusted according to a requirement in a subsequent use process. This is not limited in this disclosure.

Because the first controller may control one or more components, the second controller performs authentication on the first controller instead of performing authentication on the components, so that the second controller does not perform authentication on all the components. In this way, it is not necessary to preset a key and implant an algorithm in all components that have authentication requirements, but the key needs to be preset and the algorithm needs to be implanted in only a few controllers, so that more components can be controlled, and an anti-theft effect is achieved. Therefore, security protection can be provided for more components, more requirements can be met, and development and maintenance costs can be reduced.

In addition, to send the control instruction to the component, the first controller meets two conditions, namely, successful authentication and trusted authentication result at the same time. In other words, a condition for limiting the sending of the control instruction by the first controller is strict, so that illegal manipulation of the device can be avoided to a greater extent, and theft of the device can be avoided. Therefore, security is improved.

With reference to the second aspect, in some possible implementations of the second aspect, the method further includes receiving an authentication trustworthiness notification from the second controller, where the authentication trustworthiness notification indicates that the authentication result is trusted.

That is, the first controller may determine, based on the notification from the second controller, whether the authentication result is trusted, and further determine whether the control instruction can be sent to the component.

With reference to the first aspect or the second aspect, in some possible implementations, when a key used to unlock the device does not fall within a preset range, the authentication result is the authentication failure.

Herein, the preset range may be a sensing range of the device, that is, a maximum range in which the mobile device can sense the key.

If the key is not within the preset range, there is a possibility that the device is illegally started by a third party. In this case, the authentication result may be set to the authentication failure, so as to prevent the third party from illegally starting the device, prevent theft of the device, and have high security.

That the key is used to unlock the device may include that the key is used to unlock a door or a window, apply a high voltage, start the device, and the like. This is not limited in this disclosure.

With reference to the first aspect or the second aspect, in some possible implementations, when a predefined abnormal event is detected, the authentication result is the authentication failure.

Herein, the abnormal event may be a predefined event that is considered to be an illegal entry into the device and an illegal startup of the device, for example, including but not limited to window smashing, door smashing, and lock picking.

If the abnormal event is detected, the device may be intruded or started illegally. In this case, the authentication result may be set to the authentication failure, so as to prevent the third party from illegally starting the device, prevent theft of the device, and have high security.

According to a third aspect, this disclosure provides a component control method for a device. The method may be performed by a first controller, or may be implemented by a chip or a chip system configured in a second controller, or another function module or software that can be configured to implement some or all functions of a second controller. This is not limited in this disclosure.

The second controller in the third aspect may correspond to the controller #1 in the following embodiments.

For example, the method includes, when authentication on a first controller succeeds, sending an authentication success notification, where the authentication success notification is used to notify that authentication on the first controller succeeds, and when a response message is received, sending an authentication trustworthiness notification to the first controller, where the response message is from a component controlled by the first controller, the response message indicates that the authentication success notification is successfully received, and the authentication trustworthiness notification indicates that the authentication success notification is trusted.

In the device, different components may be used to implement different functions. In this disclosure, the component may be controlled by the first controller, and responds after receiving the control instruction of the first controller. In other words, the first controller may control, by using the control instruction, one or more components to perform corresponding operations. The component that can be controlled by the first controller may be predefined by a device manufacturer before delivery, or the component that can be controlled by the first controller may be adjusted according to a requirement in a subsequent use process. This is not limited in this disclosure.

Because the first controller may control one or more components, the second controller performs authentication on the first controller instead of performing authentication on the components, so that the second controller does not perform authentication on all the components. Therefore, it is not necessary to preset a key and implant an algorithm in all components that have authentication requirements, but the key needs to be preset and the algorithm needs to be implanted in only a few controllers, so that more components can be controlled, and an anti-theft effect is achieved. Therefore, security protection can be provided for more components, more requirements can be met, and development and maintenance costs can be reduced.

In addition, the second controller sends the authentication success notification so that the component obtains the authentication result, and the second controller sends the authentication trustworthiness notification to the first controller based on the response message fed back by the component, so that the first controller sends the control instruction after determining that the authentication result is trusted. The parties cooperate with each other, so that a condition for sending the control instruction by the first controller is met, and then a condition for responding to the control instruction by the component is met. Therefore, illegal manipulation of the device can be avoided to a greater extent, and theft of the device is avoided, and security is improved.

Optionally, the authentication success notification is sent through broadcast.

The authentication success notification is sent through broadcast, so that all components in the device can receive the authentication success notification, and full coverage is implemented. The solution of sending the authentication success notification through broadcast is especially applicable to an offline diagnosis phase before the device is delivered.

Optionally, the authentication success notification is sent to one or more predefined components.

An authentication success result is sent for the one or more predefined components, so that the one or more components may receive the notification without causing unnecessary impact on other components.

A manner of sending the authentication success notification is not limited in this disclosure.

When the second controller fails to perform authentication on the first controller, the second controller may send an authentication failure notification to notify that the authentication on the first controller fails, or may not send any notification. This is not limited in this disclosure.

Both the authentication success notification and the authentication failure notification indicate the authentication result, and may be considered as examples for indicating the authentication result.

With reference to the third aspect, in some possible implementations of the third aspect, the method further includes receiving the response message from the component.

The component feeds back the response message to the second controller, so that the second controller can determine whether the component is normal, and further determine whether the authentication result is trusted. For example, when a component is replaced, the second controller may not receive the response message. In this case, even if the authentication on the first controller succeeds, the component still cannot perform an operation because the component may have a problem. Therefore, the second controller may set the authentication result to untrusted, to prevent the first controller from sending the control instruction, to prevent the component from responding, and to achieve an anti-theft effect.

With reference to the foregoing aspects, in some possible implementations, the device is a vehicle.

In a possible design, the first controller includes a vehicle domain controller (VDC) and/or a vehicle control unit (VCU), the second controller includes at least one of the following, a vehicle integrated unit (VIU), a wireless communication control module (for example, a BLUETOOTHBLUETOOTH electronic control unit (ECU)), and a body control module (BCM), and the component includes a motor and/or a battery management system (BMS).

In another possible design, the first controller includes a wireless communication control module, the second controller includes a VIU and/or a BCM, and the component includes a door controller and/or a window controller.

In still another possible design, the first controller includes a remote communication module, the second controller includes a VIU or a BCM, and the component includes one or more of the following, a motor, a BMS, a door controller, and a window controller.

The foregoing plurality of designs may be used separately or may be used in combination without conflict. For example, the first controller is a VIU, the second controller includes a VDC and a wireless communication control module, and the component includes at least one of a motor and a BMS, and a door controller. The motor and the BMS may be controlled by the VDC, and the door controller may be controlled by the wireless communication control module.

The foregoing several designs of the first controller, the second controller, and the component are merely examples, and should not constitute any limitation on this disclosure.

For ease of understanding, the following provides several examples.

In one example, the component includes a motor, and a control instruction instructs the motor to perform a power output operation, the responding to the control instruction includes performing a power output operation in response to the control instruction.

In a possible implementation, the control instruction carries a torque request, and the responding to the control instruction includes performing a torque response and a power output in response to the torque request in the control instruction. The motor can be used to convert electrical energy into mechanical energy, to provide power to the device (for example, the vehicle) and drive the device to travel. When receiving the torque request, the motor may perform the torque response, and perform the power output, including, for example, but not limited to, driving wheel rotation and rotational speed response. The foregoing operations performed by the motor in response to the control instruction are merely examples, and operations performed by the motor in response to the control instruction are not limited in this disclosure.

The motor is controlled, so that the power output operation is not performed when the device (for example, the vehicle) is illegally started. In this way, the device cannot be driven to travel, and theft of the device is avoided.

In another example, the component includes the BMS, and the control instruction instructs the BMS to output a power source. The responding to the control instruction includes outputting the power source in response to the control instruction.

Herein, outputting the power source includes but is not limited to power on, power supply, and the like. The power source is output, so that the motor can obtain electric energy to drive the vehicle to travel.

Based on the foregoing solution, the BMS may be controlled, so that no power source is output when the device (for example, the vehicle) is illegally started. Therefore, the device cannot be started, and theft of the device is avoided.

In yet another example, the component includes a door controller, and the control instruction instructs the door controller to unlock a door. The responding to the control instruction includes unlocking the door in response to the control instruction.

In still another example, the component includes a window controller, and the control instruction instructs the window controller to unlock a window. The responding to the control instruction includes unlocking the window in response to the control instruction.

The door controller and the window controller may be controlled at the same time, or may be controlled separately. This is not limited in this disclosure.

Based on the foregoing solution, the door controller may be controlled, so that when the door or the window is illegally opened, the device (for example, the vehicle) does not unlock the door or the window. Therefore, the door or window of the device may be prevented from being opened, and an article in the device can be prevented from being lost.

According to a fourth aspect, this disclosure provides a component control apparatus for a device, including a module or a unit configured to implement the method according to any one of the first aspect and the possible implementations of the first aspect. Each module or unit may implement a corresponding function by executing a computer program.

For example, the apparatus includes a transceiver unit and a processing unit. The transceiver unit is configured to obtain a control instruction from a first controller, where the control instruction is an instruction sent by the first controller when authentication performed by a second controller on the first controller succeeds and an authentication result is trusted. The processing unit is configured to obtain an authentication result, where the authentication result indicates whether authentication performed by the second controller on the first controller succeeds, and is further configured to respond to the control instruction when the authentication result is an authentication success.

With reference to the fourth aspect, in some possible implementations of the fourth aspect, the authentication result is the authentication success, and the transceiver unit is configured to receive the authentication success notification from the second controller, where the authentication success notification is used to notify that the authentication performed by the second controller on the first controller succeeds.

With reference to the fourth aspect, in some possible implementations of the fourth aspect, the authentication success notification is sent through broadcast, or the authentication success notification is sent for one or more predefined components.

With reference to the fourth aspect, in some possible implementations of the fourth aspect, the transceiver unit is further configured to send a response message to the second controller, where the response message indicates that the authentication success notification is successfully received.

With reference to the fourth aspect, in some possible implementations of the fourth aspect, the device is a vehicle.

In a possible design, the first controller includes a VDC and/or a VCU, the second controller includes at least one of the following, a VIU, a wireless communication control unit, or a BCM, and the apparatus includes a motor and/or a BMS.

In another possible design, the first controller includes a wireless communication control unit, the second controller includes a VIU and/or a BCM, and the apparatus includes a door controller and/or a window controller.

In still another possible design, the first controller includes a remote communication unit, the second controller includes a VIU and/or a BCM, and the apparatus includes one or more of the following, a motor, a BMS, a door controller, and a window controller.

For example, the apparatus includes a motor, and the control instruction carries a torque request. The processing unit is configured to perform torque response and power output in response to the torque request in the control instruction.

In another example, the apparatus includes a BMS, and the control instruction instructs the BMS to output a power source. The processing unit is configured to output the power source in response to the control instruction.

In still another example, the apparatus includes a door controller, and the control instruction instructs the door controller to unlock a door. The processing unit is configured to unlock the door in response to the control instruction.

In still another example, the apparatus includes a window controller, and the control instruction instructs the window controller to unlock a window. The responding to the control instruction includes unlocking the window in response to the control instruction.

According to a fifth aspect, this disclosure provides a component control apparatus for a device, including a module or a unit configured to implement the method according to any one of the second aspect and the possible implementations of the second aspect. Each module or unit may implement a corresponding function by executing a computer program.

For example, the apparatus includes a transceiver unit and a processing unit. The processing unit is configured to obtain a result of authentication performed by a second controller on the apparatus, where the authentication result includes an authentication success or an authentication failure. The transceiver unit is configured to, when the authentication result is the authentication success and the authentication result is trusted, send a control instruction to a component controlled by the apparatus, to trigger the component to respond.

With reference to the fifth aspect, in some possible implementations of the fifth aspect, the transceiver unit is further configured to receive an authentication trustworthiness notification from the second controller, where the authentication trustworthiness notification indicates that the authentication result is trusted.

With reference to the fifth aspect, in some possible implementations of the fifth aspect, the device is a vehicle.

In a possible design, the apparatus includes a VDC and/or a VCU, the second controller includes at least one of the following, a VIU, a wireless communication control unit, and a BCM, and the component includes a motor and/or a BMS.

In another possible design, the apparatus includes a wireless communication control unit, the second controller includes a VIU and/or a BCM, and the component includes a door controller and/or a window controller.

In still another possible design, the apparatus includes a remote communication unit, the second controller includes a VIU and/or a BCM, and the component includes one or more of the following, a motor, a BMS, a door controller, and a window controller.

With reference to the fourth aspect or the fifth aspect, in some possible implementations, when a key used to start the device is not located within a preset range, or when a predefined abnormal event is detected, the authentication result is the authentication failure.

According to a sixth aspect, this disclosure provides a component control apparatus for a device, including a module or a unit configured to implement the method according to any one of the third aspect and the possible implementations of the third aspect. Each module or unit may implement a corresponding function by executing a computer program.

For example, the apparatus includes a transceiver unit. The transceiver unit is configured to, when authentication on the first controller succeeds, send an authentication success notification, where the authentication success notification is used to notify that authentication on the first controller succeeds and is further configured to send an authentication trustworthiness notification to the first controller when a response message is received, where the response message comes from a component controlled by the first controller, the response message indicates that the authentication success notification is successfully received, and the authentication trustworthiness notification indicates that the authentication success notification is trusted.

With reference to the sixth aspect, in some possible implementations of the sixth aspect, the authentication success notification is sent through broadcast, or the authentication success notification is sent for one or more predefined components.

With reference to the sixth aspect, in some possible implementations of the sixth aspect, the transceiver unit is further configured to receive a response message from the component, where the response message indicates that the authentication success notification is successfully received.

With reference to the sixth aspect, in some possible implementations of the sixth aspect, the device is a vehicle.

In a possible design, the apparatus includes at least one of the following, a VIU, a wireless communication control unit, and a BCM, the first controller includes a VDC and/or a VCU, and the component includes a motor and/or a BMS.

In another possible design, the apparatus includes a VIU and/or a BCM, the first controller includes a wireless communication control unit, and the component includes a door controller and/or a window controller.

In still another possible design, the apparatus includes a VIU and/or a BCM, the first controller includes a remote communication unit, and the component includes one or more of the following, a motor, a BMS, a door controller, and a window controller.

With reference to the sixth aspect, in some possible implementations of the sixth aspect, the transceiver unit is further configured to receive an authentication request from the first controller, where the authentication request is used to request to perform authentication on the first controller, and the apparatus further includes a processing unit, configured to perform authentication on the first controller in response to the authentication request, to obtain an authentication result.

Optionally, the processing unit is further configured to, when no key is detected within a preset range, determine that the authentication result is an authentication failure, where the key is a key used to start the device.

Optionally, the processing unit is further configured to, when a predefined abnormal event is detected, determine that the authentication result is an authentication failure.

According to a seventh aspect, this disclosure provides a component control apparatus for a device, including a processor, where the processor is configured to perform the component control method for a device according to any one of the first aspect or the possible implementations of the first aspect.

According to an eighth aspect, this disclosure provides a component control apparatus for a device, including a processor, where the processor is configured to perform the component control method for a device according to any one of the second aspect or the possible implementations of the second aspect.

According to a ninth aspect, this disclosure provides a component control apparatus for a device, including a processor, where the processor is configured to perform the component control method for a device according to any one of the third aspect or the possible implementations of the third aspect.

Optionally, the apparatus according to the seventh aspect to the ninth aspect may further include a memory, configured to store instructions and data. The memory is coupled to the processor, and when executing the instructions stored in the memory, the processor can implement the method described in the foregoing aspects. The apparatus may further include a communication interface. The communication interface is used by the apparatus to communicate with another device. For example, the communication interface may be a transceiver, a circuit, a bus, a module, or another type of communication interface.

According to a tenth aspect, this disclosure provides a chip system. The chip system includes at least one processor, configured to support implementation of the functions in any one of the first aspect to the third aspect and the possible implementations of the first aspect to the third aspect, for example, receiving or processing data and/or information involved in the foregoing method.

In a possible design, the chip system further includes a memory, the memory is configured to store program instructions and data, and the memory is located inside or outside the processor.

The chip system may include a chip, or may include a chip and another discrete component.

According to an eleventh aspect, this disclosure provides a vehicle. The vehicle includes a first controller, a second controller, and a vehicle. The first controller is configured to send a control instruction to a component when authentication performed by the second controller on the first controller succeeds and an authentication result is trusted, where whether the authentication result is trusted is determined based on a notification from the first controller. The component is configured to obtain the result of authentication performed by the second controller on the first controller, where the authentication result includes an authentication success or an authentication failure, and the component is further configured to respond to the control instruction when the authentication result is the authentication success.

For example, the foregoing component may be configured to perform the method according to any one of the first aspect or the possible implementations of the first aspect, and the component may correspond to the apparatus according to the fourth aspect or the seventh aspect. The first controller may be configured to perform the method according to any one of the second aspect or the possible manners of the second aspect, and the first controller may correspond to the apparatus according to the fifth aspect or the eighth aspect. The second controller may be configured to perform the method according to any one of the third aspect or the possible implementations of the third aspect, and the second controller may correspond to the apparatus according to the sixth aspect or the ninth aspect.

According to a twelfth aspect, this disclosure provides a computer-readable storage medium, including a computer program. When the computer program is run on a computer, the computer is enabled to implement the method according to any one of the first aspect to the third aspect and the possible implementations of the first aspect to the third aspect.

According to a thirteenth aspect, this disclosure provides a computer program product, where the computer program product includes a computer program (which may also be referred to as code or instructions), and when the computer program is run, the computer is enabled to perform the method according to any one of the first aspect to the third aspect and the possible implementations of the first aspect to the third aspect.

It should be understood that technical solutions in the fourth aspect to the thirteenth aspect of this disclosure correspond to technical solutions in the first aspect to the third aspect of this disclosure, and beneficial effects achieved by the aspects and corresponding feasible implementations are similar. Details are not described again.

DESCRIPTION OF EMBODIMENTS

The following describes technical solutions of this disclosure with reference to accompanying drawings.

For ease of understanding of embodiments, the following descriptions are provided first.

First, in this embodiment, prefixes such as "first" and "second" are used only to distinguish different described objects, and do not limit a location, a sequence, a priority, a quantity, or content of described objects. For example, if the described object is a "controller", an ordinal number before the "controller" in a "first controller" and a "second controller" does not limit a priority between the "controllers". For another example, a quantity of described objects is not limited by a prefix, and may be one or more objects. The "first controller" is used as an example, where there may be one or more controllers. In a word, a use of the prefix used to distinguish described objects in this embodiment of this disclosure does not constitute a limitation on the described object. For a description of the described object, refer to the context description in claims or embodiments, and a use of such a prefix should not constitute a redundant limitation.

Second, in embodiments of this disclosure, "at least one" means one or more, and "a plurality of" means two or more. "And/or" describes an association relationship between associated objects, and represents that three relationships may exist. For example, A and/or B may represent the following cases: A exists alone, both A and B exist, and B exists alone, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one of a, b, or c may represent a, b, c, a and b, a and c, b and c, or a, b, and c. Herein, a, b, and c may be singular or plural.

Third, in embodiments of this disclosure, both "when" and "if" mean that an apparatus performs corresponding processing in an objective situation, are not intended to limit time, do not require the apparatus to necessarily have a determining action during implementation, and do not mean another limitation.

Fourth, "simultaneously" in embodiment of this disclosure may be understood as "at a same time point", may be understood as "in a time period", or may be understood as "in a same period", and may be understood with reference to the context.

A device in embodiments of this disclosure may include a device that uses electric energy as a power source, for example, including but not limited to an automobile, a motorcycle, a ship, an airplane, a helicopter, a flying automobile, a lawn mower, construction equipment, a tram, a golf cart, or a train. Embodiments of this disclosure include but are not limited to this.

Figure 1:
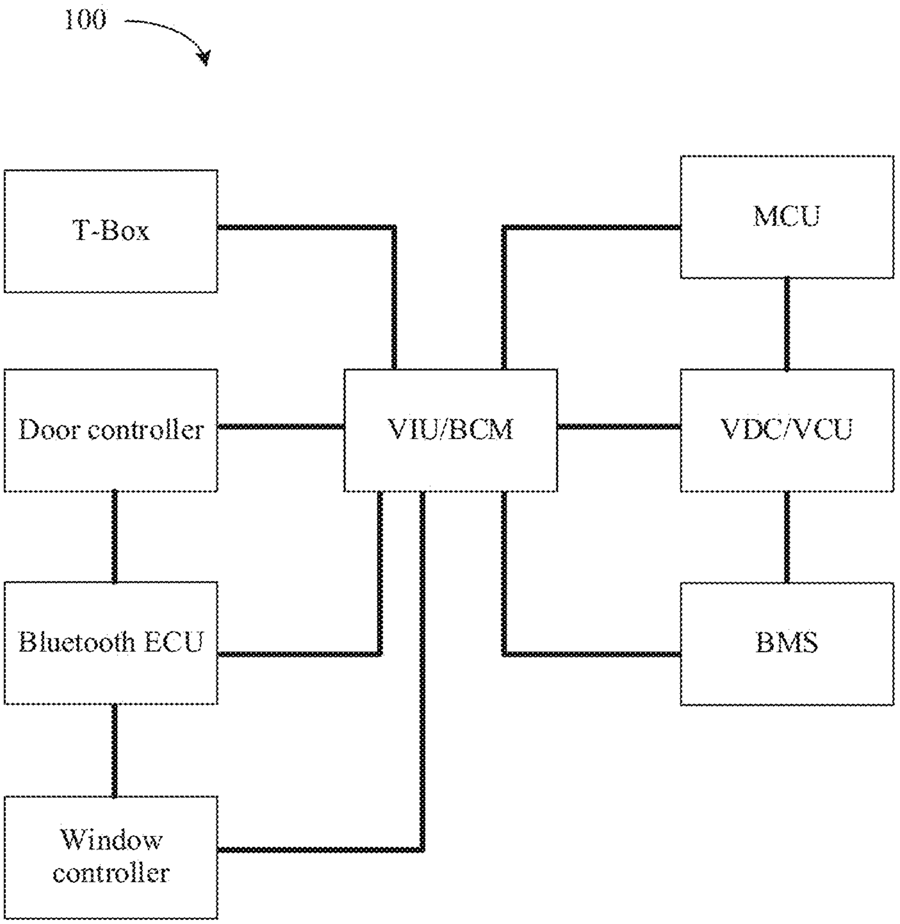
FIG. 1 is a diagram of a communication system applicable to a method according to an embodiment.

For ease of understanding of embodiments of this disclosure, the following first describes, with reference to FIG. 1, a communication system applicable to a method provided in embodiments of this disclosure. As an example, the communication system 100 shown in FIG. 1 is a vehicle-mounted communication system deployed on an automobile. As shown in FIG. 1, the system 100 includes a plurality of circuits or modules, for example, including but not limited to a VIU, a VDC, a motor, a remote communication module, a BMS, a BCM, a wireless communication control module, a door controller (or a door switch), and a VCU.

The wireless communication control module may be configured to be responsible for short-distance communication. For example, the wireless communication control module may be responsible for communication within a range of 10 meters to 20 meters. The wireless communication control module may implement wireless communication control based on technologies such as BLUETOOTH LOW ENERGY (BLE), ultra wideband (UWB), and near field communication (NFC). For example, the wireless communication control module shown in FIG. 1 is a BLUETOOTH ECU.

The wireless communication control module can be used for key unlocking. For example, when a vehicle owner carries a key close to a vehicle body, the key senses the vehicle body, and an unlocking instruction may be automatically generated and sent to the wireless communication control module. The wireless communication control module can start anti-theft authentication, and after the authentication succeeds, can control the door controller to unlock a door.

The remote communication module may be configured to be responsible for remote communication, for example, communication by using a mobile cellular network. The remote communication module shown in FIG. 1 is a telematics box (T-Box), and may be configured to communicate with a mobile application. For example, the user may send an instruction to the T-Box by using a remote application, for example, a remote vehicle control application (APP). A remote information module may include but is not limited to a T-Box. This is not limited in this disclosure.

For example, the VIU may be configured to be responsible for functions such as communication and power supply. In a possible implementation, the VIU is a controller in a low-voltage domain. In some cases, the VIU may alternatively be replaced with the BCM.

The motor shown in FIG. 1 is a motor control unit (MCU), and may be configured to provide power for an automobile and drive the automobile to travel. The VDC may control the MCU, for example, trigger the MCU to perform a power output action by sending a control instruction to the MCU. The VDC may further obtain battery related information from the BMS, and further determine whether communication of the BMS is normal, whether a parameter is normal, and the like, so as to determine whether the BMS can work normally. The VDC can control the MCU when it is determined that the BMS can work normally.

The T-Box may control, in response to a remote operation of the user, for example, an operation on a remote vehicle control APP in a mobile terminal, a different operation of the automobile, for example, turning on an air conditioner, opening a window, or opening a door.

Modules in the vehicle may communicate with each other by using an in-vehicle communication link. For example, a VIU may communicate with the VDC, the BMS, the BCM, the MCU, a CDC, the wireless communication control module, the door controller, and the like by using the in-vehicle communication link. As an example instead of a limitation, the vehicle-mounted communication link may include a Controller Area Network (CAN) bus, a CAN with a flexible data rate (FD) (CAN FD) bus, a local interconnect network (LIN) bus, a flex ray bus, a media oriented system transport (MOST) bus, an automotive Ethernet, and the like. Each module in the figure is named only for the convenience of distinguishing different functions, and does not constitute any limitation on a quantity of each module, nor does it constitute any limitation on a name of each module included in the vehicle.

The system 100 shows only some of the modules of the automobile, the automobile may include more or fewer modules than these modules shown, or combine some modules, or split some modules, or have different component arrangements. The components shown in the figure may be implemented by hardware, software, or a combination of software and hardware.

In addition, another device may alternatively include some or all of the modules shown in FIG. 1, or include another module having a same or similar function. This is not limited in this disclosure.

The device control method provided in this disclosure is intended to provide an anti-theft solution for the device. Anti-theft is to avoid theft of the device, that is, to provide a power anti-theft solution for a power system, and to avoid theft of articles in the device, that is, to provide a key anti-theft solution for a door and a window of the device.

As mentioned above, in an extensive point-to-point authentication solution, a key needs to be preset and an algorithm needs to be implanted in all components requiring authentication and in controllers. For example, the key and algorithm are preset in all modules of the vehicle before the device is delivered. Development and maintenance costs are high.

In view of this, this disclosure provides a method, where authentication on a component is transferred to authentication on a controller that can control each component, and authentication performed by a controller #1 on the component is transferred to authentication performed by the controller #1 on a controller #2. The controller #2 may send a control instruction to the component when the authentication succeeds and an authentication result is trusted. The component may respond to the control instruction after the authentication succeeds. Therefore, although authentication is not directly performed on the component in this solution, the component may receive the control instruction only when authentication on the controller #2 succeeds and the authentication result is trusted. This is the same as performing authentication on the component. It is not necessary to preset a key and implant an algorithm in all components that have authentication requirements, but the key needs to be preset and the algorithm needs to be implanted in only a few controllers, and control of each component can be implemented. Therefore, development and maintenance costs can be reduced. In addition, a condition for the component to respond to the control instruction can be met only when a plurality of parties are controlled to cooperate with each other, so that illegal manipulation of the device can be avoided to a greater extent, and theft of the device is avoided. Therefore, security can be improved.

The following describes in detail the methods provided in embodiments of this disclosure with reference to the accompanying drawings.

Figure 2:
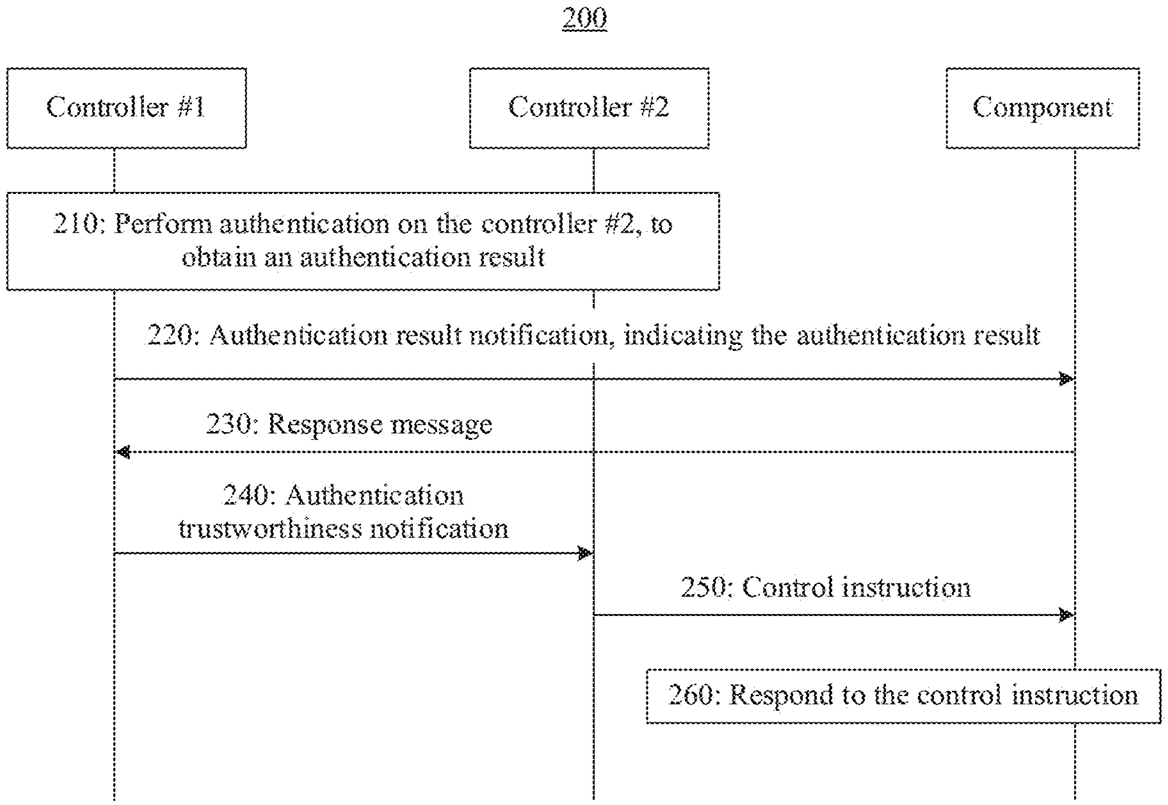
FIG. 2 is a schematic flowchart of a component control method for a device according to an embodiment.

FIG. 2 is a schematic flowchart of a component control method 200 for a device according to an embodiment of this disclosure. As shown in FIG. 2, the method 200 may include step 210 to step 260. Steps of the method 200 are described in detail below.

In step 210, a controller #1 performs authentication on a controller #2, to obtain an authentication result.

Here, the authentication may include, for example, anti-theft authentication. The controller #1 is considered as a primary authentication device and can be used to perform authentication on a platform. In this embodiment of this disclosure, the controller #2 may control a plurality of components in the device, for example, collect component related information (for example, whether communication is normal, and a parameter) from each component, and send a control instruction to each component. If authentication performed by the controller #1 on each component is transferred to authentication on the controller #2, an operation of point-to-point authentication performed by the controller #1 on each component that has an authentication requirement may be omitted. In other words, the controller #2 may perform authentication with the primary authentication device (that is, the controller #1) in place of each component. Therefore, the controller #2 in this embodiment of this disclosure may be considered as a secondary authentication device.

When a user performs an operation to enable the device to perform an operation, for example, enable the device to output a power source or perform power output, the controller #2 may be triggered to start authentication and send an authentication request to the controller #1. In different scenarios, user operations for triggering device power-on may be different. The following describes, with reference to different scenarios, the user operation for triggering device power-on and triggering the controller #2 to start authentication. Details are not described herein.

In response to the received authentication request, the controller #1 may perform authentication on the controller #2, to obtain the authentication result.

Figure 3:
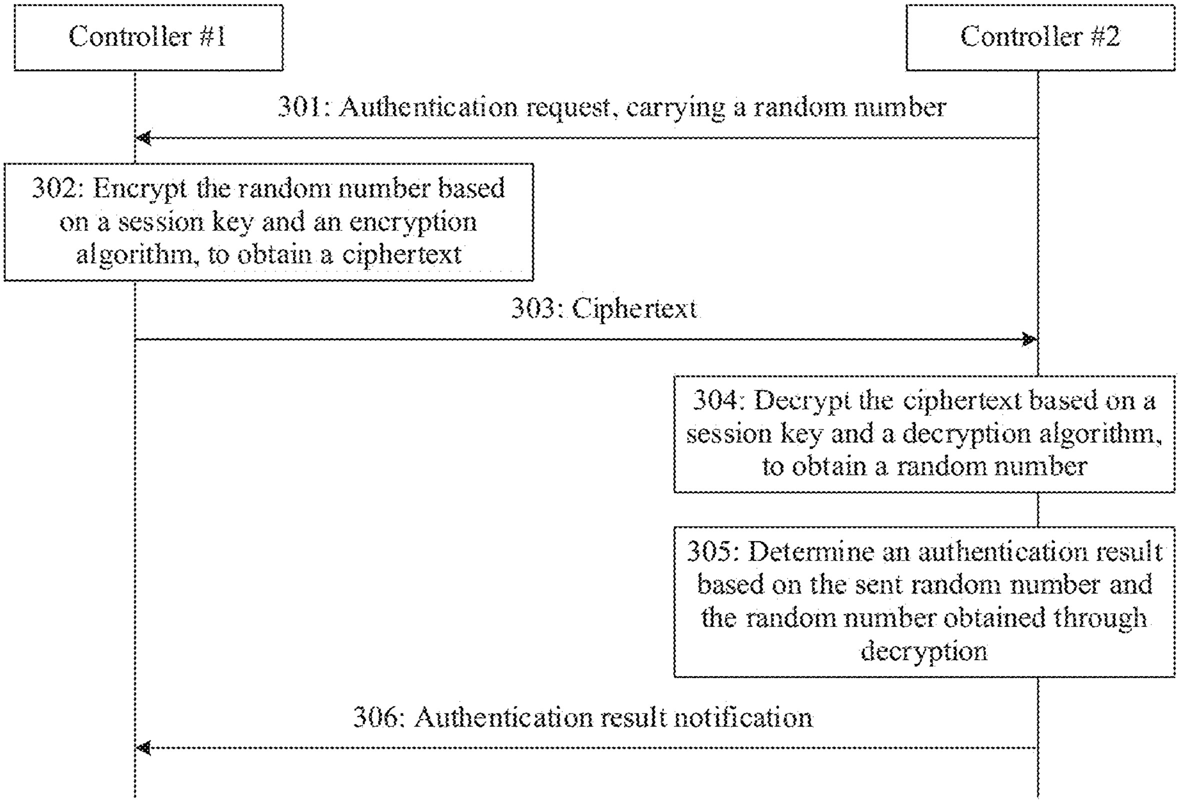
FIG. 3 is a diagram of an authentication process according to an embodiment.

FIG. 3 shows an example of an authentication process. The foregoing step 210 is described in more detail, and includes the following steps.

Step 301: The controller #2 sends an authentication request to the controller #1, where the authentication request carries a random number.

For example, the authentication request may be an authentication challenge message.

Step 302: The controller #1 encrypts the received random number based on a preset key and encryption algorithm, to obtain a ciphertext.

For example, the key may be a session key (SK) negotiated in advance with the controller #2.

The ciphertext may be, for example, a personal identification number (PIN) code. The PIN code is an identification code of a device. For example, when the device is an automobile, the PIN code is an identification code of the automobile, is commonly referred to as an engine electronic anti-theft system, and may be used to avoid theft of the automobile.

Step 303: The controller #1 sends the ciphertext to the controller #2.

For example, the ciphertext may be carried in an authentication response message.

Step 304: The controller #2 decrypts the ciphertext based on a preset key and decryption algorithm, to obtain a random number.

The key preset in the controller #2 is a key negotiated in advance with the controller #1, and the two keys may be the same, for example, both are SKs. The decryption algorithm preset in the controller #2 corresponds to the encryption algorithm preset in the controller #1.

The ciphertext is decrypted based on the preset key and decryption algorithm to obtain a plaintext. In this embodiment, the plaintext is the random number.

Step 305: The controller #2 determines an authentication result based on the sent random number and the random number obtained through decryption.

It may be understood that if the controller #1 encrypts the random number from the controller #2 to obtain the ciphertext, the random number obtained by decrypting the ciphertext by the controller #2 should be a same random number as the random number sent in step 301. In other words, if the random number sent by the controller #2 is the same as the random number obtained through decryption, authentication succeeds. If the random number sent by the controller #2 is different from the random number obtained through decryption, authentication fails. The controller #2 may determine the authentication result based on the sent random number and the random number obtained through decryption.

Step 306: The controller #2 sends an authentication result notification to the controller #1.

The controller #2 may send the authentication result notification to the controller #1, to indicate whether authentication performed by the controller #1 succeeds. For example, the authentication result notification is carried in an authentication status message.

The authentication process described above with reference to FIG. 3 is merely an example, and an authentication process is not limited in this disclosure. For example, step 306 in FIG. 3 does not need to be performed, and the controller #2 may alternatively indicate whether authentication succeeds by sending or not sending the authentication result. For example, if the authentication succeeds, the authentication result is sent. If the authentication fails, the authentication result is not sent. In this way, the controller #1 may determine, according to whether the authentication result is received, whether the authentication succeeds.

It should be noted that the authentication process shown above is performed when authentication on the key succeeds. The key is a key used to open the device, to provide high voltage to power on the device, or to start the device. The key may implement an unlocking function based on, for example, a BLUETOOTH technology, an UWB technology, or an NFC technology.

A key authentication process is similar to the authentication process described above with reference to FIG. 3. Details are not described herein again. It may be understood that, if the key is not within a sensing range of the device, authentication cannot be performed on the key, that is, authentication fails. The authentication on the controller #2 in this specification may be performed when the authentication on the key succeeds. If the authentication on the key fails, the authentication result may be directly determined as an authentication failure, and the authentication on the controller #2 does not need to be performed.

The following steps are performed on the basis of performing authentication on the controller #2. In other words, it is assumed that authentication on the key succeeds.

In step 220, the controller #1 sends an authentication result notification, where the authentication result notification indicates the authentication result. Correspondingly, the component obtains the authentication result.

The authentication result includes an authentication success or an authentication failure.

In the foregoing authentication process, the controller #1 may determine the authentication result. The controller #1 may further notify the component of the authentication result notification to indicate whether the authentication on the controller #2 succeeds.

It may be understood that the authentication result notification may be an authentication result notification received by the controller #1 from the controller #2 in the foregoing authentication process, or may be an authentication result notification generated by the controller #1 based on an authentication result notification received from the controller #2. This is not limited in this disclosure.

In a possible implementation, the controller #1 may send an authentication success notification when the authentication succeeds. The authentication success notification may be used to notify that the authentication on the controller #2 succeeds. In other words, the authentication success notification is an example of the authentication result notification. When the authentication fails, the controller #1 may not send any notification. If the component does not receive any notification, the component may determine that the authentication performed by the controller #1 on the controller #2 fails.

In another possible implementation, the controller #1 sends the authentication result notification regardless of whether the authentication succeeds, to indicate whether the authentication succeeds or fails. The authentication result may include a field indicating success or failure. For example, "1" indicates that authentication succeeds, and "0" indicates that authentication fails. Alternatively, the authentication result may be indicated in another manner. This is not limited in this disclosure. If the authentication result is an authentication success, the authentication result notification may be an authentication success notification. If the authentication result is the authentication failure, the authentication result notification may be an authentication failure notification.

In the foregoing two implementations, when the authentication succeeds, the controller #1 may send the authentication success notification. When the authentication fails, the controller #1 may send an authentication failure notification, or may not send any notification. However, it may be understood that, regardless of whether the controller #1 sends the authentication result notification, the component may determine the authentication result based on a status of receiving the authentication result notification. The figure is merely an example, and shows a step in which the controller #1 sends the authentication result notification to the component. Actually, a receiving end of the authentication result notification is not limited in this disclosure.

The foregoing latter implementation is used as an example. The controller #1 may send the authentication result notification through broadcast, so that all components connected by using a communication link can receive the notification. This implements full coverage. This solution is especially applicable to an offline diagnosis phase before the device is delivered. The controller #1 may alternatively send the authentication result notification to one or more predefined components, so that the one or more components receive the notification without causing unnecessary impact on other components. The one or more predefined components may be pre-written by a developer in the controller #1 by using code. For example, in an automobile, the one or more predefined components may include one or more of the following, a motor, a BMS, and a door controller.

In step 230, the component sends a response message to the controller #1, where the response message indicates that the authentication result notification is successfully received.

Each component that receives the foregoing authentication result notification may send a response message to the controller #1, to indicate that the authentication result notification is successfully received. Alternatively, the component that needs to send the response message may be predefined. For example, a developer may write, in advance, the component that needs to feed back the response message into the controller #1 by using code.

As described above, if the controller #1 fails to perform authentication on the controller #2, the authentication result notification may not be sent. In this case, the component may not need to send a response message to the controller #1. In other words, when the authentication fails, step 230 is not necessarily performed. The figure is merely an example, and shows a step in which the component sends the response message to the controller #1.

In step 240, the controller #1 sends an authentication trustworthiness notification to the controller #2 based on the received response message, where the authentication trustworthiness notification indicates that the authentication result is trusted.

A reason why the component needs to feed back the response message is because it is considered that in a scenario in which the component is replaced, a replaced component may not send a response message to the controller #1, so that the controller #1 detects a component exception in time, and further sets the authentication result to untrusted.

On the contrary, if the controller #1 receives the response message from the component, the controller #1 may consider that the component is normal and is not replaced, and may further notify the controller #2 that the authentication result is trusted.

The controller #1 may determine, based on a status of receiving the response message, whether the foregoing authentication result is trusted, and notify the controller #2.

In a possible implementation, the controller #1 may send an authentication trustworthiness notification to the controller #2 when determining that the authentication result is trusted, to indicate that the authentication result is trusted, or may not send any notification when the authentication result is untrusted. If the controller #2 does not receive any notification, the controller #2 may determine that the authentication result is untrusted. In other words, when the controller #1 does not receive the response message, step 240 is not necessarily performed.

In another possible implementation, the controller #1 sends a notification regardless of whether the authentication result is trusted, to indicate whether the authentication result is trusted or untrusted. For example, if the authentication result is trusted, the notification is an authentication trustworthiness notification. If the authentication result is untrusted, this notification is an authentication untrusted notification.

In the foregoing two implementations, when the authentication is trusted, step 240 may be performed, that is, the controller #1 sends the authentication trustworthiness notification to the controller #2. When the authentication is untrusted, step 240 may be performed or may not be performed. The figure is merely an example, and shows a step in which the controller #1 sends an authentication trustworthiness notification to the controller #2.

In step 250, the controller #2 sends the control instruction to the component when the authentication succeeds and the authentication result is trusted.

As described above, the controller #2 may determine whether the authentication succeeds or fails by performing the authentication process shown in FIG. 3. The controller #2 may further determine, based on whether the authentication trustworthiness notification is received, whether the authentication result is trusted. In this embodiment of this disclosure, the controller #2 can send the control instruction to the component only when both the two conditions are met, the authentication succeeds and the authentication result is trusted.

The control instructions sent by the controller #2 may be used to trigger the component to respond. In other words, the component that receives the control instruction is a component controlled by the controller #2. Further, a relationship between the controller #2 and the component may be predefined. For example, for a different controller #2, one or more components that can be controlled by the controller #2 may be specified in advance. Because the relationship between the controller #2 and the component is described in the following with reference to an example, details are not described herein.

In step 260, the component responds to the control instruction if the authentication performed by the controller #1 on the controller #2 succeeds.

Because the controller #2 sends the control instruction only when receiving the authentication trustworthiness notification, receiving the control instruction by the component means that the authentication result is trusted. That is, the condition that the authentication result is trusted in the foregoing two conditions has been met. After receiving the control instruction, the component may first determine whether authentication performed by the controller #1 on the controller #2 succeeds, and may respond to the control instruction if the authentication succeeds and the other condition is also met.

Corresponding to that in the foregoing implementation in which the controller #1 sends the authentication result, the component may determine, based on different implementations, whether the authentication succeeds. For example, corresponding to that in the previous implementation, the component may determine that the authentication succeeds when the authentication success notification is received, and determine that the authentication fails when no notification is received. Corresponding to that in the latter implementation, the component may determine whether the authentication succeeds or fails based on the information indicated in the received authentication result.

Based on the foregoing solution, to control the component to perform a corresponding operation, authentication between the controller #1 and the controller #2 needs to succeed, and the component needs to participate in the authentication and respond to an authentication result, so that when the authentication on the controller #2 succeeds and the component is normal, the controller #2 sends the control instruction. In this way, the component responds to the received control instruction only when the authentication succeeds and the authentication result is trusted. The controller #2 can control one or more components because the authentication on the components is transferred to the authentication on the controller #2. Therefore, it is not necessary to preset the key and implant the algorithm in all components that have authentication requirements, but the key needs to be preset and the algorithm needs to be implanted in only a few controllers. The control of each component can be realized, and an anti-theft effect can be achieved. Therefore, security protection can be provided for more components, more requirements can be met, and development and maintenance costs can be reduced. In addition, a condition for the component to respond to the control instruction can be met only when a plurality of parties are controlled to cooperate with each other, so that illegal manipulation of the device can be avoided to a greater extent, and theft of the device can be avoided. Therefore, security is improved.

The following describes in detail the controller #1, the controller #2, the component, the control instruction, and the response of the component by using an automobile as an example of a platform. It should be noted that, in each example in the following, it is assumed that the authentication on the controller #2 succeeds and the authentication result is trusted, and the component determines that the component can respond to the received control instruction. To better understand the method provided in this disclosure, the following describes the method by using a plurality of examples with reference to an example scenario.

1. Power Anti-Theft Scenario

Power system theft prevention is intended to prevent theft of an automobile, which can be achieved by controlling a power execution component (for example, a motor) or a power source component (for example, a BMS).

Optionally, the controller #1 is at least one of the following, a VIU, a BCM, and a wireless communication control module. The controller #2 is a VDC, and a component controlled by the VDC includes a motor and/or a BMS. A component that receives the control instruction may include a motor and/or a BMS.

The control instruction sent by the VDC to the motor carries a torque request, and the torque request may be used to control the motor to execute a torque response, so as to output power to drive the automobile to travel. In response to the torque request in the control instruction, the motor may perform operations such as the torque response and the power output.

The control instruction sent by the VDC to the BMS can be used to control the BMS to output a power source, so that the automobile has a power source, and then provides power for starting. In response to the control instruction, the BMS may output the power source.

It should be noted that the controller #2 may send the control instruction to the motor, or may send the control instruction to the BMS, or may send the control instruction to both the motor and the BMS. It may be understood that as long as either of the motor and the BMS does not respond to the control instruction, the automobile cannot be started. In other words, the VDC can provide an anti-theft effect by controlling the motor and/or the BMS to prevent theft of the automobile.

For example, when detecting a gear switching operation, the VDC may start authentication. The VDC may actively send an authentication request to the VIU. The VIU performs authentication on the VDC based on the authentication request. For authentication between the VIU and the VDC, refer to the foregoing related description with reference to FIG. 3. Details are not described herein again.

The VIU may send an authentication result notification for the VDC to the motor to indicate an authentication result for the VDC. The motor may feed back a response message for the authentication result. After receiving the response message from the motor, the VIU sends an authentication trustworthiness notification to the VDC. When determining that the authentication succeeds and the authentication result is trusted, the VDC may send a control instruction to the motor. The control instruction may be used to control the motor to perform a power output operation. In other words, if the authentication on the VDC fails, or the VDC determines that the authentication result is untrusted, no control instruction is sent to the motor. In this way, the motor does not perform any operation when the authentication on the VDC succeeds but the authentication result is untrusted, that is, the automobile cannot be started. In this way, theft of the automobile is avoided.

After receiving the authentication result notification, the motor may determine whether the VDC authentication succeeds. If the authentication succeeds, the motor may respond to the received control instruction. If the authentication fails, no response may be made to the received control instruction. As a result, the motor does not perform any operation when the authentication on the VDC fails, that is, the automobile cannot be started. In this way, theft of the automobile is avoided.

In some cases, a third party may steal the vehicle by replacing a module.

For example, the third party may steal the vehicle by replacing the VDC. A newly replaced VDC may not send an authentication request to the VIU, to avoid authentication. However, in this solution, because the VIU does not perform authentication on the VDC, the motor cannot receive an authentication result notification from the VIU. However, when receiving no authentication result notification, the motor cannot determine that the authentication succeeds. Therefore, even if the VDC sends the control instruction to the motor, the motor does not respond to the control instruction. That is, even if the VDC is replaced, the automobile will not start.

For another example, the third party may steal the vehicle by replacing a VIU. However, because the key and algorithm used for authentication in the VIU are preset before delivery, it is difficult to steal. Even if the VIU is replaced, it is difficult to successfully authenticate the VDC. The motor does not respond to the control instruction when the authentication fails. That is, the automobile cannot start even if the VIU is replaced.

For another example, the third party may steal the vehicle by replacing the motor. However, if the motor is replaced, the motor does not feed back a response message for the authentication result. If the VIU does not receive the response message, the VIU sets the authentication result to untrusted. In this way, the VDC does not send a control instruction to the motor, and the motor does not perform any operation without receiving the control instruction, and the automobile still cannot be started.

In another example, when detecting a gear switching operation, the VDC may start authentication. The VDC may actively send an authentication request to the VIU. The VIU performs authentication on the VDC based on the authentication request. For authentication between the VIU and the VDC, refer to the foregoing related description with reference to FIG. 3. Details are not described herein again.

The VIU may send an authentication result notification for the VDC to the BMS, to indicate the authentication result for the VDC. The BMS may feed back a response message for the authentication result. After receiving the response message from the BMS, the VIU may send an authentication trustworthiness notification to the VDC. When determining that the authentication succeeds and the authentication result is trusted, the VDC may send a control instruction to the BMS, where the control instruction is used to control the BMS to perform a power source output action. In other words, if the authentication on the VDC fails, or the VDC determines that the authentication result is untrusted, no control instruction is sent to the BMS. In this way, the BMS does not output a power source when the authentication on the VDC succeeds and the authentication result is untrusted. The automobile cannot be started without the power source output. In this way, theft of the automobile is avoided.

Similar to the foregoing example, if any one of the VIU, VDC, and the BMS is replaced, the BMS does not output the power source, and the automobile cannot be started without the power source output. In this way, theft of the automobile is avoided.

It can be seen that, in this solution, a condition for the power execution component to perform the power output operation and/or the power source to perform the power source output operation needs to be met by cooperation of a plurality of parties. If either party is replaced, the component may not perform the corresponding operation, so that illegal manipulation of the automobile can be avoided to a greater extent, theft of the vehicle is avoided, and security is improved.

2. Key Anti-Theft Scenario

Key anti-theft is intended to prevent a door and a window of the automobile from being opened, and to avoid theft of articles in the vehicle.

Optionally, the controller #1 is a VIU and/or a BCM, the controller #2 is a wireless communication control module, and a component controlled by the wireless communication control module includes a door controller and/or a window controller.

The control instruction sent by the VDC to the door controller may be used to control the door controller to unlock the door, so that the door can be opened. In response to the control instruction, the door controller unlocks the door. Similarly, the control instruction sent by the VDC to the window controller may be used to control the window controller to unlock the window, so that the window can be opened. In response to the control instruction, the window controller unlocks the window. Therefore, the VDC can provide the anti-theft effect through the control of the door controller. In this way, theft of articles in the automobile is avoided.

As an example, a BLUETOOTH ECU (that is, an example of the wireless communication control module) may start anti-theft authentication when receiving an unlock command from a key. The BLUETOOTH ECU may actively send an authentication request to the VIU. The VIU performs authentication on the BLUETOOTH ECU based on the authentication request. For authentication between the VIU and the BLUETOOTH ECU, refer to the foregoing related description with reference to FIG. 3. Details are not described herein again.

The VIU may send an authentication result notification for the BLUETOOTH ECU to the door controller and the window controller, so as to indicate an authentication result for the BLUETOOTH ECU. The door controller and the window controller may feed back a response message for the authentication result. After receiving the response messages from the door controller and the window controller, the VIU sends an authentication trustworthiness notification to the BLUETOOTH ECU. When determining that the authentication succeeds and the authentication result is trusted, the BLUETOOTH ECU may send a control instruction to the door controller and the window controller. The control instruction may be used to indicate the door controller to perform an action of unlocking the door and the window.

After receiving the authentication result notification, the door controller may determine whether authentication on the BLUETOOTH ECU succeeds. If the authentication succeeds, the door and the window may be unlocked according to the received control instruction, and the door and the window are opened. If the authentication fails, no response may be made to the received control instruction, and the door and window still cannot be opened. In this way, when the authentication fails, the BLUETOOTH ECU does not perform an action of unlocking the door and window. In this way, theft of articles in the vehicle is avoided. Because the door and window cannot be opened, the third party cannot enter the automobile and cannot start the automobile. In this way, theft of the automobile can also be avoided.

Similar to the principle described in the foregoing example, if any one of the VIU, the BLUETOOTH ECU, and the door controller is replaced, the door controller does not unlock the door and the window, and the third party cannot enter the vehicle. In this way, theft of articles in the vehicle is avoided and theft of the automobile is avoided.

3. Remote Anti-Theft Scenario

With development of intelligent terminals, a remote vehicle control application is more widely used. The remote vehicle control application can be used to remotely control functions, such as starting, turning off, unlocking, locking, and searching the vehicle. When the application is used, a vehicle owner can open the door and start the vehicle without the need for a key.

Remote anti-theft is intended to prevent the vehicle from being remotely operated, for example, to prevent the door and the window from being opened, so that theft of articles in the vehicle is avoided, or to prevent the vehicle from being started, so that theft of the vehicle is avoided.

Optionally, the controller #1 is a VIU, a BCM, or a wireless communication control module, the controller #2 is a remote communication module, and a component controlled by the remote communication module include one or more of a motor, a BMS, and a door controller. A component that receives this control instruction may be one or more of a motor, a BMS, and a door controller.

The control of the remote communication module to the motor, the BMS, and the door controller is similar to the control of the VDC to the motor and the BMS and the control of the BLUETOOTH ECU to the door controller in the foregoing example. In the foregoing example, two cases of implementing anti-theft of the automobile by controlling the power execution component and/or the power source component and implementing anti-theft of the articles in the vehicle by controlling the door controller are respectively described in detail with reference to the example. Details are not described herein again.

It should be noted that the remote communication module may simultaneously control the door controller and at least one of the motor and the BMS, to provide an anti-theft effect by controlling the door controller, and provide an anti-theft effect by controlling the motor and/or the BMS. In this way, theft of the articles in the automobile is avoided and the theft of the automobile is avoided.

Based on the same concept, remote anti-theft can also be used to prevent other modules in the vehicle from being illegally started. For example, an air conditioner in the vehicle is illegally turned on, causing unnecessary waste of resources. Through implementation of this solution, the air conditioner can also be prevented from being illegally turned on. For example, the VIU or the wireless communication module is used as the controller #1, the remote communication module is used as the controller #2, and the BCM configured to control the air conditioner is used as the component. Through implementation of the foregoing solution, the BCM can be prevented from controlling the air conditioner to turn on.

In the plurality of scenarios and examples provided above, examples of the controller #1, the controller #2, and the component are merely examples for ease of understanding, and should not constitute any limitation on this disclosure. Based on a same concept, a person skilled in the art may further use other modules to implement functions of the controller #1, the controller #2, and the component respectively.

To further improve security and avoid theft of the device to a greater extent, this solution further considers other scenarios, and determines the authentication result based on more factors.

As described above, if the authentication on the key fails before the authentication on the controller #2, the authentication result may be directly determined as the authentication failure. In this way, theft of the device can be avoided to a greater extent.

Optionally, before step 210, the method further includes determining whether the key is located within a preset range. Correspondingly, step 210 may be performed after it is determined that the key is located within the preset range, and the authentication result may be determined based on an authentication process for the controller #2. On the contrary, if it is determined that the key is not within the preset range, the authentication result may be determined as the authentication failure.

Herein, the preset range may be a sensing range of the device. In other words, if the key can be sensed within the sensing range of the device, the key is considered to be within the sensing range. If the key is not sensed within the sensing range of the device, it is considered that the key is not within the sensing range. A size of the preset range may be determined by a device manufacturer. This is not limited in this disclosure.

For example, if the vehicle owner temporarily leaves the automobile with the key, the vehicle is unlocked, and the vehicle is still in a power-on state, the third party can enter the automobile directly to start the automobile. As described above, because the key is not within the sensing range of the automobile, the authentication on the key fails, and therefore the authentication result is the authentication failure. In this case, the third party cannot start the automobile, so as to avoid theft of the automobile.

In addition, in order to prevent the third party from entering the vehicle and causing the loss of the articles in the vehicle, the automobile can be automatically locked. An automatic vehicle locking function includes but are not limited to automatic power-off, door lock, and window lock. For example, when it is detected that duration in which no one is in the vehicle exceeds preset duration, the vehicle is automatically locked. The preset duration may be determined by the device manufacturer. This is not limited in this disclosure.

Optionally, the method further includes, when an abnormal event is detected, determining that the authentication result is the authentication failure.

Herein, the abnormal event may be a predefined event, for example, including but not limited to smashing a window, smashing a door, and picking a lock. The abnormal event may be reported to the controller #1 after being detected by a sensor. Once the controller #1 receives reporting of the abnormal event, the controller #1 may determine that the authentication result is the authentication failure.

For example, if the vehicle owner leaves the automobile and leaves the key in the automobile, but the door is locked, the third party can force into the automobile to obtain the key by smashing the window, smashing the door, and picking the lock, to start the automobile. In this case, the authentication result may also be directly determined as the authentication failure. Even if the third party obtains the key and has the condition to start the automobile, the automobile cannot be started due to the authentication failure. In this way, theft of the automobile is avoided.

In addition, the sensor can start a camera after detecting the abnormal event, to monitor an environment around the automobile, save captured images, and upload the images to a mobile terminal of the vehicle owner, so as to notify the vehicle owner in time to avoid greater losses.

It can be learned from the plurality of examples that, by using the solution provided in this disclosure, development and maintenance costs caused by presetting a key and implanting an algorithm in all components can be reduced, and a trusted anti-theft mechanism is further provided, to avoid theft of the device, for example, the automobile, and achieve high security.

For ease of understanding, the foregoing describes the component control method provided in this disclosure by using several components in the automobile as examples. These components and functions of the components are merely examples, and should not constitute any limitation on this disclosure. The components used to implement functions such as power output, power source output, control of the door, the window, the air conditioner, and the like listed above and names thereof are not limited in this disclosure.

In addition, the foregoing describes several possible scenarios by using the automobile as an example, but this should not constitute any limitation on a device to which this disclosure is applicable. As described above, the solution may be further applied to another device. In different devices, forms and names of the controller #1, the controller #2, and the component may be different from each other. However, this should not affect an application scope of this disclosure. As long as functions of the controller #1, the controller #2, and the component can be implemented, control of the device component needs to be implemented.

The examples provided above are merely several possible scenarios, and constitute no limitation on a scenario to which this solution is applied. Based on a same concept, a person skilled in the art may further determine the authentication result based on more factors, so as to improve security to a greater extent.

The foregoing describes in detail the methods provided in embodiments of this disclosure with reference to FIG. 2 and FIG. 3. The following describes in detail the apparatuses provided in embodiments of this disclosure with reference to FIG. 4 and FIG. 5.

Figure 4:
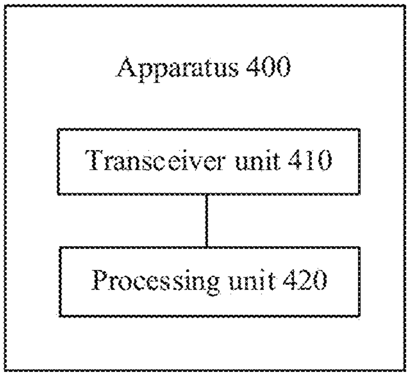
FIG. 4 and FIG. 5 are block diagrams of component control apparatuses for a device according to an embodiment.

FIG. 4 is a block diagram of a component control apparatus 400 for a device according to an embodiment of this disclosure. As shown in FIG. 4, the apparatus 400 may include a transceiver unit 410 and a processing unit 420.

In a possible design, the apparatus 400 shown in FIG. 4 may correspond to the components in the foregoing method embodiments, and may perform steps performed by the components in the foregoing method embodiments. For example, the apparatus 400 may be the component, a chip or a chip system configured in the component, or another logical unit or software that can implement some or all functions of the component. This is not limited in this disclosure.

The transceiver unit 410 may be configured to obtain a control instruction from the controller #2, where the control instruction is an instruction sent by the controller #2 when authentication performed by the controller #1 on the controller #2 succeeds and an authentication result is trusted. The processing unit 420 may be configured to obtain the result of authentication performed by the controller #1 on the controller #2, where the authentication result includes an authentication success or an authentication failure. The processing unit 420 may be further configured to respond to the control instruction when the authentication result is the authentication success.

The apparatus 400 may include units configured to perform processes and/or steps corresponding to components in the foregoing method 200. For brevity, details are not described herein.

In another possible design, the apparatus 400 shown in FIG. 4 may correspond to the controller #1 in the foregoing method embodiment, and may perform steps performed by components in the foregoing method embodiment. For example, the apparatus 400 may be the controller #1, a chip or a chip system configured in the controller #1, or another logical module or software that can implement some or all functions of the controller #1. This is not limited in this disclosure.

The transceiver unit 410 may be configured to send an authentication success notification when the authentication on the controller #2 succeeds, where the authentication success notification is used to notify that the authentication on the controller #2 succeeds, and may be further configured to send an authentication trustworthiness notification when a response message is received, where the response message is from a component controlled by the controller #2, and indicates that the authentication success notification is successfully received, and the authentication trustworthiness notification indicates that the authentication success notification is trusted.

The apparatus 400 may include units configured to perform processes and/or steps corresponding to the controller #1 in the foregoing method 200. For brevity, details are not described herein.

In still another possible design, the apparatus 400 shown in FIG. 4 may correspond to the controller #2 in the foregoing method embodiment, and may perform steps performed by components in the foregoing method embodiment. For example, the apparatus 400 may be a controller #2, a chip or a chip system configured in the controller #2, or another logical unit or software that can implement some or all functions of the controller #2. This is not limited in this disclosure.

The processing unit 420 may be configured to obtain a result of authentication performed by the controller #1 on the apparatus 400, where the authentication result includes an authentication success or an authentication failure. The transceiver unit 410 may be configured to, when the authentication result is the authentication success and the authentication result is trusted, send a control instruction to the component controlled by the apparatus 400, to trigger the component to respond.

The apparatus 400 may include units configured to perform processes and/or steps corresponding to the controller #2 in the foregoing method 200. For brevity, details are not described herein.

Functions of the apparatus 400 may be implemented by using hardware, software, or a combination of software and hardware.

In this embodiment of this disclosure, division into the units is an example, and is merely a logical function division. In actual implementation, another division manner may be used. In addition, functional units in embodiments of this disclosure may be integrated into one processor, or each of the units may exist alone physically, or two or more units are integrated into one unit. The integrated unit may be implemented in a form of hardware, or may be implemented in a form of a software functional unit.

Figure 5:
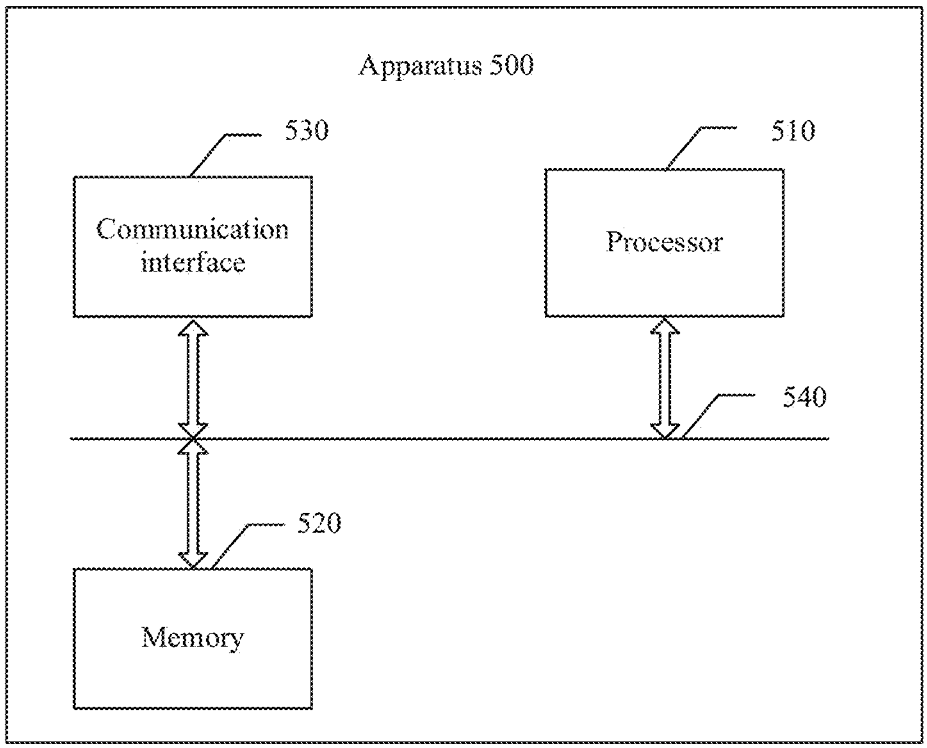

FIG. 5 is another block diagram of a component control apparatus 500 for a device according to an embodiment of this disclosure. As shown in FIG. 5, the apparatus 500 includes a processor 510 and a memory 520. The memory 520 may be configured to store a computer program, and the processor 510 may be configured to invoke and execute the computer program, so that the apparatus implements functions of the component, the controller #1, or the controller #2 in the method provided in embodiments of this disclosure.

Optionally, the apparatus 500 may further include a communication interface 530. The communication interface 530 may be a transceiver, an interface, a bus, a circuit, or an apparatus that can implement a transceiver function. The communication interface 530 is configured to communicate with another device by using a transmission medium, so that the apparatus 500 communicates with the another device.

For example, if the apparatus 500 corresponds to the components in the foregoing method embodiment, the processor 510 may be configured to control the communication interface 530 to obtain a control instruction from the controller #2, where the control instruction is an instruction sent by the controller #1 when authentication performed by the controller #2 on the controller #1 succeeds and an authentication result is trusted. The processor 510 may be further configured to obtain the result of authentication performed by the controller #1 on the controller #2, and respond to the control instruction when the authentication result is an authentication success, where the authentication result includes the authentication success or an authentication failure. For details, refer to the detailed description in the method 200. Details are not described herein again.

In another example, if the apparatus 500 corresponds to the controller #1 in the foregoing method embodiment, the processor 510 may be configured to, when the authentication on the controller #2 succeeds, control the communication interface 530 to send an authentication success notification, where the authentication success notification is used to notify that the authentication on the controller #2 succeeds. The processor 510 may be further configured to, when a response message is received, control the communication interface 530 to send an authentication trustworthiness notification, where the response message is from a component controlled by the controller #2, and indicates that the foregoing authentication success notification is successfully received, and the authentication trustworthiness notification indicates that the foregoing authentication success notification is trusted. For details, refer to the detailed description in the method 200. Details are not described herein again.

In another example, if the apparatus 500 corresponds to the controller #2 in the foregoing method embodiment, the processor 510 may be configured to obtain a result of authentication performed by the controller #1 on the apparatus 500, where the authentication result includes an authentication success or an authentication failure. The processor 510 may be further configured to, when the authentication result is the authentication success and the authentication result is trusted, control the communication interface 530 to send a control instruction to the component controlled by the apparatus 500, to trigger the component to respond. For details, refer to the detailed description in the method 200. Details are not described herein again.

The coupling in this embodiment of this disclosure may be an indirect coupling or a communication connection between apparatuses, units, or modules in an electrical form, a mechanical form, or another form, and is used for information exchange between the apparatuses, the units, or the modules. The processor 510 may collaboratively operate with the memory 520. The processor 510 may execute program instructions stored in the memory 520. At least one of the at least one memory may be included in the processor.

A connection medium between the processor 510, the memory 520, and the communication interface 530 is not limited in this embodiment of this disclosure. In this embodiment of this disclosure, the memory 520, the processor 510, and the communication interface 530 are connected through a bus 540 in FIG. 5. The bus is represented by a bold line in FIG. 5. A connection manner between other components is merely an example for description, and is not limited thereto. The bus may be classified into an address bus, a data bus, a control bus, and the like. For ease of representation, only one bold line is used for representation in FIG. 5, but this does not mean that there is only one bus or only one type of bus.

The processor in the embodiments of this disclosure may be an integrated circuit chip, and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this disclosure. The general-purpose processor may be a microprocessor, or the processor may be any processor or the like. The steps in the methods disclosed with reference to embodiments of this disclosure may be directly performed and completed by a hardware decoding processor, or may be performed and completed by using a combination of hardware in the decoding processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

A memory in embodiments of this disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), used as an external cache. Through example but not limitative description, many forms of RAMs may be used, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus RAM (DR RAM). It should be noted that the memory of the systems and methods described in this specification includes but is not limited to these and any memory of another proper type.

This disclosure further provides an automobile. The automobile may include the components in the foregoing method embodiments, the controller #1, and the controller #2.

This disclosure further provides a computer-readable storage medium. The computer-readable storage medium stores a computer program. When the computer program is executed by a processor, the method performed by the component in the embodiment shown in FIG. 2 is implemented, or the method performed by the controller #1 in the embodiment shown in FIG. 2 or FIG. 3 is implemented, or the method performed by the controller #2 in the embodiment shown in FIG. 2 or FIG. 3 is implemented.

This disclosure further provides a computer program product, including a computer program. When the computer program is run, the method performed by the component in the embodiment shown in FIG. 2 is implemented, or the method performed by the controller #1 in the embodiment shown in FIG. 2 or FIG. 3 is implemented, or the method performed by the controller #2 in the embodiment shown in FIG. 2 or FIG. 3 is implemented.

The terms such as “unit” and “module” used in this specification may indicate computer-related entities, hardware, firmware, combinations of hardware and software, software, or software being executed.

A person of ordinary skill in the art may be aware that, in combination with illustrative logical blocks described in embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure. In the several embodiments provided in this disclosure, it should be understood that the disclosed apparatus, device, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit.

In the foregoing embodiments, all or some of the functions of the function units may be implemented by using software, hardware, firmware, or any combination thereof. When software is used to implement the embodiments, all or a part of the embodiments may be implemented in a form of a computer program product. The computer program product includes one or more computer instructions (programs). When the computer program instructions are loaded and executed on a computer, the processes or functions according to embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state disk (SSD)), or the like.

When the functions are implemented in the form of a software functional unit and sold or used as an independent product, the functions may be stored in a computer-readable storage medium. Based on such an understanding, the technical solutions of this disclosure may be implemented in a form of a software product. The computer software product is stored in a storage medium, and includes several instructions for instructing a computer device (which may be a personal computer, a server, or a network device) to perform all or some of the steps of the method described in embodiments of this disclosure. The foregoing storage medium includes any medium that can store program code, such as a USB flash drive, a removable hard disk, a ROM, a RAM, a magnetic disk, or an optical disc.

The foregoing descriptions are merely examples of implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A component control method for a device, the component control method comprising:
- obtaining a control instruction from a first controller, when authentication performed by a second controller on the first controller succeeds and when trusting an authentication result of the authentication;
- obtaining the authentication result, wherein the authentication result comprises an authentication success or an authentication failure, wherein obtaining the authentication result comprises receiving an authentication success notification from the second controller when the authentication result is the authentication success, and wherein the authentication success notification notifies the device that the authentication performed by the second controller on the first controller has succeeded; and
- responding to the control instruction when the authentication result is the authentication success.

2. The component control method of claim 1, wherein receiving the authentication success notification comprises receiving the authentication success notification from a broadcast.

3. The component control method of claim 1, wherein the method further comprises sending a response message to the second controller, and wherein the response message indicates that the authentication success notification is received.

4. The component control method of claim 1, wherein the device is a vehicle, and wherein the first controller comprises a vehicle domain controller (VDC) and/or a vehicle control unit (VCU), wherein the second controller comprises at least one of a vehicle integrated unit (VIU), a wireless communication control module, or a body control module (BCM), and wherein the component comprises a motor and/or a battery management system (BMS).

5. The component control method of claim 4, wherein the component comprises the motor, wherein the control instruction carries a torque request, and wherein responding to the control instruction comprises performing a torque response and a power output response.

6. The component control method of claim 4, wherein the component comprises the BMS, wherein the control instruction instructs the BMS to output from a power source, and wherein responding to the control instruction comprises outputting power.

7. The component control method of claim 1, wherein the device is a vehicle, wherein the first controller comprises a wireless communication control module, wherein the second controller comprises a vehicle integrated unit (VIU) and/or a body control module (BCM), and wherein the component comprises a door controller and/or a window controller.

8. The component control method of claim 7, wherein the component comprises the door controller, the control instruction instructs the door controller to unlock a door, and responding to the control instruction comprises unlocking the door, or wherein the component comprises the window controller, the control instruction instructs the window controller to unlock a window, and responding to the control instruction comprises unlocking the window.

9. The component control method of claim 1, further comprising determining that the authentication result is the authentication failure when a key configured to unlock the device is outside a preset range, or when detecting a predefined abnormal event.

10. The component control method of claim 1, wherein the method further comprises sending, by the second controller to the first controller, an authentication trustworthiness notification based on receiving a response message from the component, and wherein the authentication trustworthiness notification indicates that the authentication result is trusted.

11. A component control apparatus comprising:

a memory configured to store a computer program; and at least one processor coupled to the memory, and configured to execute the computer program to cause the component control apparatus to:

obtain a control instruction from a first controller, when authentication performed by a second controller on the first controller succeeds and when trusting an authentication result of the authentication;

obtain the authentication result, wherein the authentication result comprises an authentication success or an authentication failure;

receive an authentication success notification from the second controller when the authentication result is the authentication success, wherein the authentication success notification notifies a device that the authentication performed by the second controller on the first controller has succeeded;

recognize the authentication failure when determining that a key configured to unlock the device is not located within a preset range, or when detecting a predefined abnormal event; and respond to the control instruction when the authentication result is the authentication success.

12. The component control apparatus of claim 11, wherein the device is a vehicle, and wherein the first controller comprises a vehicle domain controller (VDC) and/or a vehicle control unit (VCU), wherein the second controller comprises at least one of a vehicle integrated unit (VIU), a wireless communication control module, or a body control module (BCM), and wherein the component comprises a motor and/or a battery management system (BMS).

13. The component control apparatus of claim 11, wherein the device is a vehicle, wherein the first controller comprises a wireless communication control module, wherein the second controller comprises a vehicle integrated unit (VIU) and/or a body control module (BCM), and wherein the component comprises a door controller and/or a window controller.

14. The component control apparatus of claim 11, wherein the device is a vehicle, wherein the first controller comprises a vehicle domain controller (VDC) and/or a vehicle control unit (VCU), wherein the second controller comprises at least one of a vehicle integrated unit (VIU), a wireless communication control module, or a body control module (BCM), and wherein the component comprises a motor and/or a battery management system (BMS).

15. The component control apparatus of claim 11, wherein the at least one processor is further configured to execute the computer program to further cause the component control apparatus to send a response message to the second controller, and wherein the response message indicates that the authentication success notification is received.

16. The component control apparatus of claim 11, wherein receiving the authentication success notification comprises receiving the authentication success notification from a broadcast.

17. A computer program product comprising instructions stored on a non-transitory medium and that, when executed by at least one processor, cause a component control to:

obtain a control instruction from a first controller, when authentication performed by a second controller on the first controller succeeds and when trusting an authentication result of the authentication;

obtain the authentication result, wherein the authentication result comprises an authentication success or an authentication failure;

receive an authentication success notification from the second controller when the authentication result is the authentication success, wherein the authentication success notification notifies a device that the authentication performed by the second controller on the first controller has succeeded, wherein the device is a vehicle, and wherein the first controller comprises a vehicle domain controller (VDC) and/or a vehicle control unit (VCU), and wherein the second controller comprises at least one of a vehicle integrated unit (VIU), a wireless communication control module, or a body control module (BCM), and wherein the vehicle comprises a motor and/or a battery management system (BMS); and respond to the control instruction when the authentication result is the authentication success.

18. The computer program product of claim 17, wherein the device is a vehicle, wherein the first controller comprises a wireless communication control module, wherein the second controller comprises a vehicle integrated unit (VIU) and/or a body control module (BCM), and wherein the vehicle comprises a door controller and/or a window controller.

19. The computer program product of claim 17, wherein the instructions are further configured to, when executed by the at least one processor, further cause the component control to recognize the authentication failure when a key configured to unlock the device is not located within a preset range, or when detecting a predefined abnormal event.

20. The computer program product of claim 17, wherein the instructions are further configured to, when executed by the at least one processor, further cause the component control to send a response message to the second controller, and wherein the response message indicates that the authentication success notification is received.

21. The computer program product of claim 17, wherein the motor performs a torque response and a power output in response to a torque request in the control instruction.

22. The computer program product of claim 17, wherein the instructions are further configured to, when executed by the at least one processor, further cause the component control to receive an authentication trustworthiness notification from the second controller, and wherein the authentication trustworthiness notification indicates that the authentication result is trusted based on the second controller receiving a response message from the component.

* * * * *